(12) United States Patent
Enriquez (10) Patent No.: US 8,275,702 B1
(45) Date of Patent: Sep. 25, 2012

(54) SYSTEMS AND METHODS FOR PROCESSING FINANCIAL OBLIGATIONS OF A CUSTOMER

(75) Inventor: Monica Enriquez, Atascosa, TX (US)

(73) Assignee: United States Automobile Association, San Antonio, TX (US)

( * ) Notice: Subject to any disclaimer, the term of this patent is extended or adjusted under 35 U.S.C. 154(b) by 0 days.

(21) Appl. No.: 11/320,518

(22) Filed: Dec. 28, 2005

(51) Int. Cl.
*G06Q 40/00* (2012.01)
(52) U.S. Cl. .......................................... 705/39
(58) Field of Classification Search ............ 705/35, 705/39
See application file for complete search history.

(56) References Cited

U.S. PATENT DOCUMENTS

| | | | |
|---|---|---|---|
| 4,795,892 A | 1/1989 | Gilmore et al. | |
| 6,886,741 B1* | 5/2005 | Salveson | 235/375 |
| 7,092,916 B2 | 8/2006 | Diveley et al. | |
| 7,158,955 B2 | 1/2007 | Diveley et al. | |
| 7,165,052 B2* | 1/2007 | Diveley et al. | 705/74 |
| 7,702,583 B1* | 4/2010 | Hamilton et al. | 705/40 |
| 2002/0087337 A1 | 7/2002 | Hensley | |
| 2002/0087469 A1 | 7/2002 | Ganesan et al. | |
| 2002/0111886 A1* | 8/2002 | Chenevich et al. | 705/30 |
| 2002/0111916 A1* | 8/2002 | Coronna et al. | 705/64 |
| 2002/0143709 A1 | 10/2002 | Diveley | |
| 2003/0055783 A1* | 3/2003 | Cataline et al. | 705/40 |
| 2003/0167231 A1 | 9/2003 | Winking et al. | |
| 2004/0215560 A1* | 10/2004 | Amalraj et al. | 705/40 |
| 2005/0209961 A1 | 9/2005 | Michelsen et al. | |
| 2006/0178986 A1 | 8/2006 | Giordano et al. | |

OTHER PUBLICATIONS http://www.neteller.com/home/index.isf, Neteller Plc,(2000),1 p.
"Electronic Payments", http://www.efunds.com/web/products-services/electronic-payments.htm, eFunds Corporation,(2005),1 p.
"Nochex Personal Account", http://www.nochex.com/personal.htm, Nochex,(1999),1 p.
"Recurring Billing Services", http://www.verisign.com/products-services/payment-processing/online-payment/internet-billing/index.html, VeriSign, Inc.,(1995),1 p.

* cited by examiner

*Primary Examiner* — Lalita M Hamilton
(74) *Attorney, Agent, or Firm* — Perkins Coie LLP (57) ABSTRACT

Systems and methods to process financial obligations of a customer are described. The method may include processing a payment for a pending financial obligation, receiving an indication that a payment source is unavailable, selecting an alternate payment source, and initiating a funds transfer from the alternate payment source to satisfy the pending financial obligation. The method may additionally include receiving a future financial obligation and determining if a first payment source is available to satisfy the future obligation, selecting an alternate payment source if the first payment source is unavailable and configuring a future electronic funds transfer. The system may include a transfer module to execute a funds transfer from a payment source to satisfy a financial obligation of a customer, the payment source selected by a payment processor module, the payment processor module configured to determine the availability of the payment source and to select an alternate payment source if the selected payment source is unavailable.

19 Claims, 8 Drawing Sheets

SYSTEMS AND METHODS FOR PROCESSING FINANCIAL OBLIGATIONS OF A CUSTOMER

RELATED APPLICATIONS

This disclosure is related to pending U.S. patent application Ser. No. 11/320,163, titled "SYSTEMS AND METHODS FOR PROCESSING FINANCIAL OBLIGATIONS OF A CUSTOMER," and U.S. patent application Ser. No. 11/320,519, titled "SYSTEMS AND METHODS FOR PROCESSING FINANCIAL OBLIGATIONS OF A CUSTOMER," filed on an even date herewith.

TECHNICAL FIELD

This application relates to systems and methods for payment processing and more particularly to systems and methods of processing financial obligations of a customer.

BACKGROUND

Today, convenience and automation are two of the ways that a company can differentiate itself. They provide easier ways for their customers to interact with them and ways for those customers to be handled in a more automated way. The company is then able to re-deploy service representatives into other roles that might be more productive to its goals.

A way that customers have used automation is in paying bills, through mechanisms such as web-enabled bill-pay and e-bills. A customer is able to spend minutes, rather than hours, managing the bills they get every month. This decreases possibilities for losing a paper copy of the bill. Without e-bills, the customer needs to contact the company, get a new paper bill issued and then pay that bill. This could take time and, in some cases, results in the customer being charged a late fee. In some cases, failure to pay one bill on time may even result in a loss of insurance coverage, or an imposition of accelerated mortgage pay-off penalties.

SUMMARY

In an embodiment, a method of processing a financial obligation of a customer includes include processing a payment for a pending financial obligation, receiving an indication that a payment source is unavailable, selecting an alternate payment source, and initiating a funds transfer from the alternate payment source to satisfy the pending financial obligation. In a further embodiment, the method may additionally include receiving a future financial obligation and determining if a first payment source is available to satisfy the future obligation, selecting an alternate payment source if the first payment source is unavailable and configuring a future electronic funds transfer. In another embodiment, a system of processing a financial obligation of a customer includes a transfer module to execute a funds transfer from a payment source to satisfy a financial obligation of a customer, the payment source selected by a payment processor module, the payment processor module configured to determine the availability of the payment source and to select an alternate payment source if the selected payment source is unavailable.

BRIEF DESCRIPTION OF DRAWINGS

Embodiments are illustrated by way of example and not limitation in the accompanying drawings, in which like reference characters indicate similar elements and in which.

DETAILED DESCRIPTION

In the following detailed description of example embodiments, reference is made to the accompanying drawings which form a part hereof, and in which is shown by way of illustration specific embodiments in which the example method, apparatus and system may be practiced. It is to be understood that other embodiments may be used and structural changes may be made without departing from the scope of this description.

Figure 1:
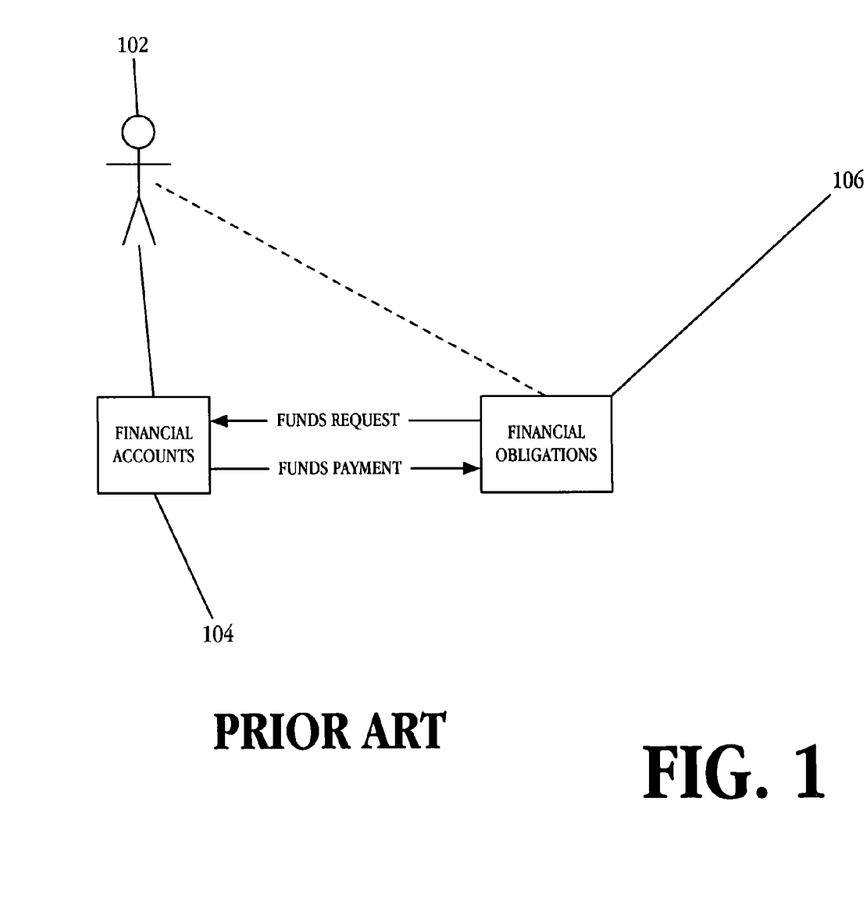
FIG. 1 shows a high level block diagram of a system for processing a financial obligation, in accordance with the prior art.

FIG. 1 shows a high level block diagram of a system for satisfying a financial obligation, in accordance with the prior art. In an embodiment, a customer 102 has one or more financial accounts 104 and one or more financial obligations 106 that may be satisfied by the funds present in the one or more financial accounts.

In an embodiment, the customer 102 has one or more financial obligations 106. These financial obligations 106 may include, without limitation, insurance premium bills, credit card bills, payments to a retirement account, payments to a savings account, mortgage payments, and the like. These financial obligations 106 relate, in their broadest sense, to anything that the customer must pay. In an embodiment, the financial obligation 106 may be paid with an electronic funds transfer. In an alternate embodiment, the financial obligation 106 may be paid by the entity managing the financial account from which funds are withdrawn. In such an example, the entity may print a check on-demand or create an electronic file that can be used to print a check, the check presented to satisfy the financial obligation 106.

In an embodiment, the customer 102 has one or more financial accounts 104. These financial accounts 104 may include, without limitation, checking accounts, savings accounts, brokerage accounts, credit card accounts, line of credit accounts and the like. Use of specific examples is only meant as an illustration of a variety of accounts from which funds may be withdrawn to satisfy a pending financial obligation and is not meant to be limiting in any way.

A financial obligation 106 of the customer 102 that comes due causes a fund transfer request to be sent to one of the customer's financial accounts 104. Such a transaction is pre-configured by the customer some time before the financial obligation 106 comes due. One example of this would be a periodic insurance premium payment. A periodic payment is any regularly recurring payment and may include, without limitation, weekly, monthly, quarterly, semi-annually, annually, or otherwise. The customer provides to the insurance company an account from which to withdraw funds. The funds are intended to satisfy that periodic insurance premium payment. The customer authorizes the insurance company to withdraw funds regularly. Through this mechanism, the customer pays their periodic insurance premium without having to write out a check and send it in. Electronic processing of this payment ensures that neither the bill, nor the check is lost in the mail or misplaced by the customer. If it were, the bill might not get paid and the customer could incur a risk of losing insurance coverage.

But, configuration of an account to pay a financial obligation 106, such as the periodic insurance premium payment, does not ensure that it is paid. Configuring an automatic deduction of funds from a financial account ignores the status of that financial account. For example if the financial account 104 were previously depleted and no longer had sufficient funds to cover that deduction, the obligation could go unpaid. In other words, the financial account 104 could be considered unavailable for the payment of that financial obligation 106. For a periodic insurance premium payment, this could result in a situation where the customer could be uninsured.

The system, depicted in FIG. 1, provides a basic framework in which financial obligations 106 of a customer 102 could be satisfied using a financial account 104 of the customer 102. But, the system does not provide a framework for operations when that financial account is unavailable for payment. Besides being depleted of funds, there could be other situations where a financial account is unavailable for payment, which will be discussed in more detail below.

Figure 2A:
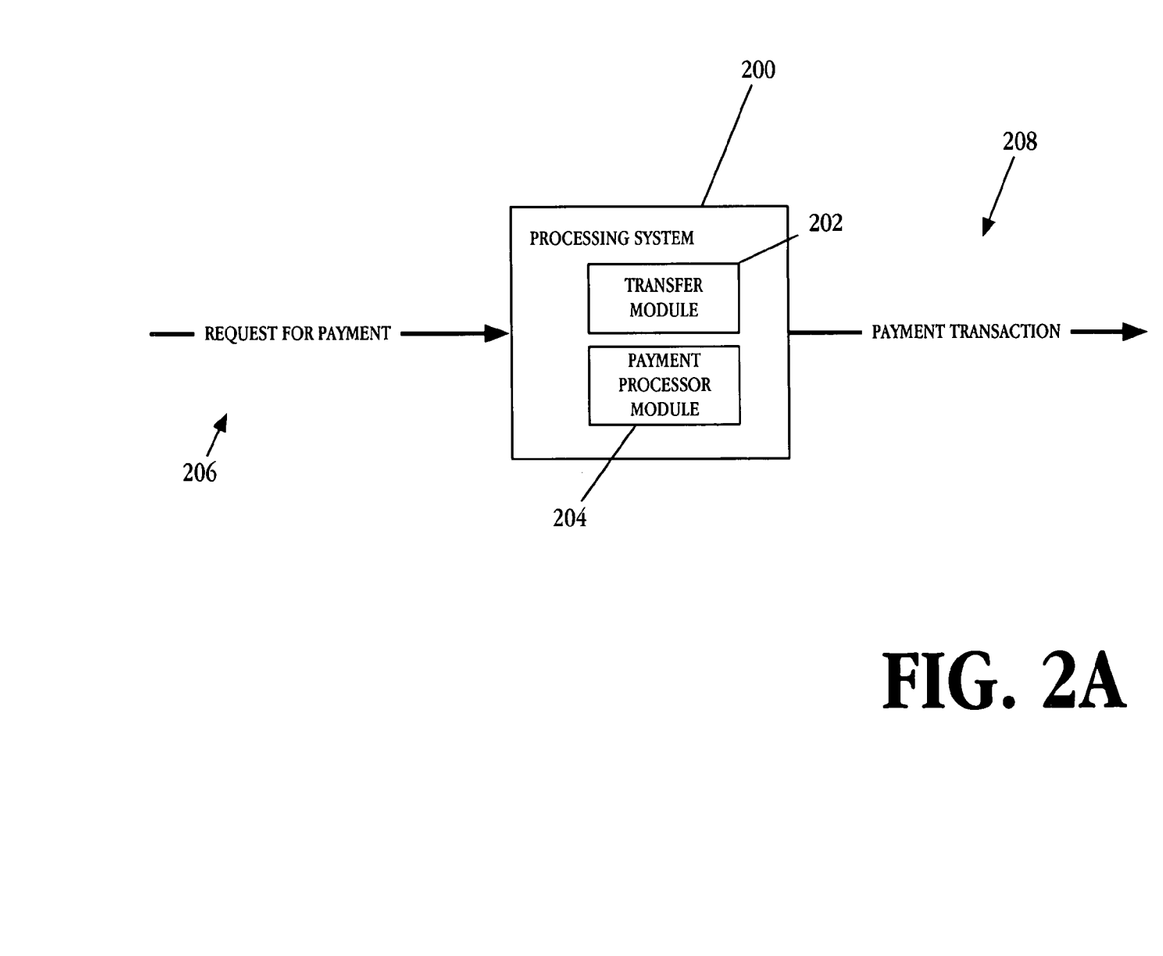
FIG. 2A shows a high level block diagram of an apparatus for processing a financial obligation, in accordance with an example embodiment.

FIG. 2A shows a high level block diagram for payment of financial obligations, in accordance with an example embodiment. In an embodiment, a processing system 200 includes a transfer module 202 and a payment processor module 204. The processing system 200 receives payment requests 206 as inputs and completes a payment transaction 208 in response to the payment request as an output. The apparatus depicted in FIG. 2A provides, in one example, a mechanism by which a customer can be reasonably assured that financial obligations are met, even when one or more of their financial accounts might be unavailable.

In an embodiment, the transfer module 202 is configured to conduct an electronic funds transfer, the transfer causes funds to be sent from a first financial account to a second financial account. In the context of the present discussion, the first financial account may be a financial account associated with a customer and the second financial account may represent an account associated with a financial obligation of the customer. Transferring of funds to the second financial account could satisfy the customer's financial obligation. Referring to the previous example of a customer who has a periodic insurance premium payment, the periodic insurance premium payment represents their financial obligation. For the purpose of illustration, the customer configures a recurring transaction to pay the periodic insurance premium payment from their checking account. Each period, the insurance company sends a payment request to the checking account and funds are withdrawn from the checking account to satisfy the pending premium payment.

In an embodiment, the payment processor module 204 is configured to determine if a first payment source is available. In one embodiment, the payment processor module 204 is provided with a designation of the first payment source by the transfer module 202. In an alternate embodiment, the transfer module 202 provides the payment processor module 204 with a designation of the type of financial obligation and the payment processor module 204 selects a payment source from a list of payment sources, and then determines if that selected payment source is available. In a first embodiment, if the first payment source is unavailable, the payment processor module 204 is configured to select a second payment source, where it determines if the second selected payment source is available. In a second embodiment, the payment processor module 204 is configured to select from a list of payment sources a payment source that is available and has sufficient funds.

Figure 2B:
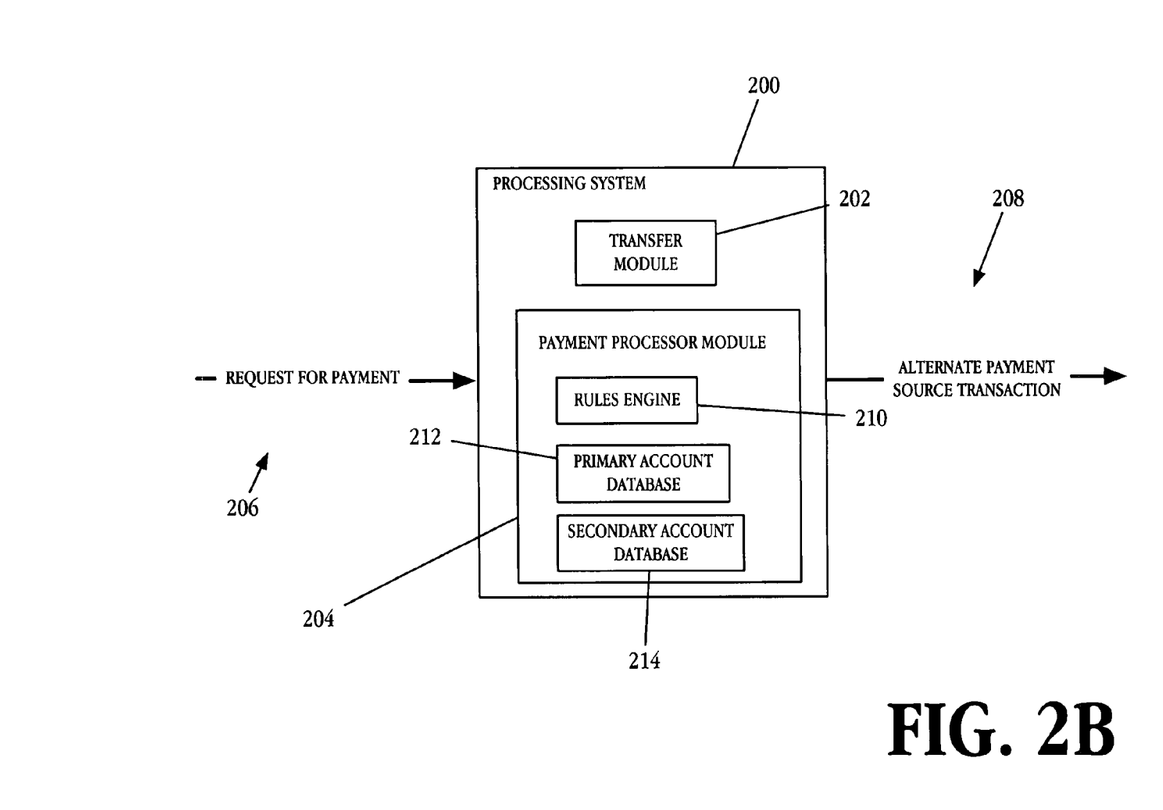
FIG. 2B shows a more detailed architecture of an apparatus for processing a financial obligation, in accordance with an example embodiment.

FIG. 2B shows a more detailed architecture of an apparatus for payment of financial obligations, in accordance with an example embodiment. FIG. 2B is similar to FIG. 2A, in one example, with the addition of submodules within the payment processor module 204. The submodules include a rules engine 210, a primary account database 212 and a secondary account database 214.

The rules engine 210 is configured to read and execute one or more rules. In one embodiment, the rules define the methods, by which a payment source is selected by the payment processor module 204. In one example, the rules define the methods by which an alternate, or second payment source, is selected if the payment source received from the transfer module 202 is unavailable. In an alternate example, the rules define a method by which a payment source is selected from a list of payment sources.

In an embodiment, the payment processor module 204 maintains a database of financial accounts available to a customer. The financial account databases may include a primary account database 212 and a secondary account database 214. In one embodiment, the primary account database 212 and the secondary account database 214 are combined into one account database. A primary account, as used herein, may be a financial account associated with the customer that may be maintained by the same entity that operates the processing system. The primary financial account database may be dynamically maintained, such that the customer need not provide an account number to satisfy financial obligations. An example of such a system would include the customer authorizing the entity to use all of their financial accounts to satisfy financial obligations presented to it related to the customer. A secondary financial account, as used herein, may be a financial account associated with the customer that is not maintained by the same entity that operates the processing system 200.

In an embodiment, the rules engine 210 selects payment sources from the primary account database 212 and the secondary account database 214. The primary account database 212 may provide a quicker and more dynamic mechanism through which the rules engine 210 can select a payment source. For example, the primary account database 212 could dynamically query each of the accounts for their present financial state. In an embodiment, the rules engine 210 is configured to read the present financial state of the payment sources defined by the primary account database 212 and select one of the payment sources based on the rules, including the present financial state of those payment sources. The secondary account database 214 provides a larger set of payment sources that may be used to satisfy the financial obligations of the customer, but may not be able to be dynamically queried. In such an arrangement, the rules engine 210 queries the payment sources defined in the secondary account database 214. However, the present financial state of the payment source may be ignored by the rules engine 210 in such a situation.

Returning to the example of the customer paying a periodic insurance premium payment, discussion of the functions of the apparatus described with respect to FIG. 2B can be made. The customer, as discussed above, configures a recurring transaction for the payment of their periodic insurance premium. The processing system 200 receives a request for payment when the payment becomes due. In this example, the first payment source is unavailable, and the payment processor module 204, using the rules engine 210, is configured to select an alternate payment source to satisfy the payment request. The rules engine 210 dynamically queries the present financial accounts of the customer that are managed by the same entity that manages the payment source. These are also known as primary financial accounts, which were first configured to satisfy the periodic insurance premium payment.

Discussion of a system and apparatus for the processing of a payment has been discussed and methods of using the system and apparatus described can be further investigated below.

Figure 3:
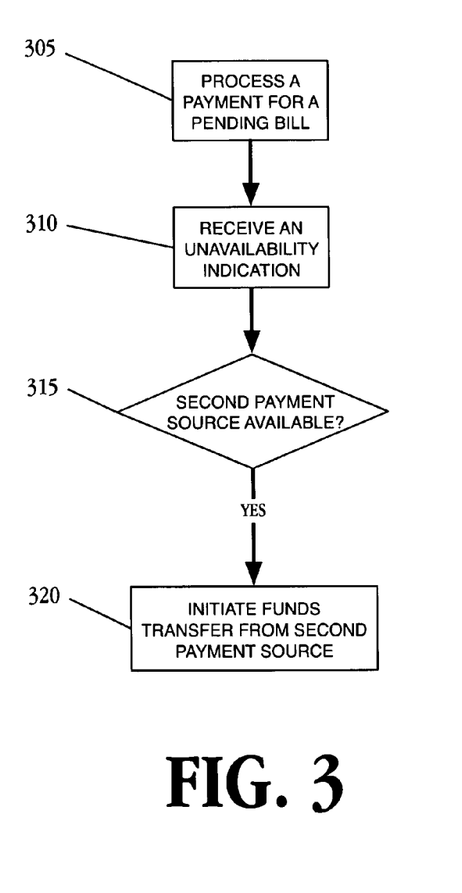
FIG. 3 shows a flow diagram of a method of processing a financial obligation, in accordance with an example embodiment.

FIG. 3 shows a flow diagram of a method of satisfying a financial obligation, in accordance with an example embodiment. The operations depicted in FIG. 3 may be carried out, in one example, on the apparatus described above with respect to FIG. 2A.

At block 305, a pending bill is processed for payment. The pending bill could represent any financial obligation of the user as discussed above. The pending bill is presented to the entity that manages the financial account from which funds will be deducted to satisfy the bill.

At block 310, the system receives a non-payment indication related to the payment. A non-payment indication is an indication that the account from which the funds are being transferred is unavailable. An account could be unavailable for any number of reasons including, without limitation, insufficient funds, funds requested exceed some pre-set amount, an Automated Clearing House (ACH) network unreachable, or the like.

At block 315, a determination is made whether a second payment source is available for the satisfaction of the payment. If a second payment source is available, a funds transfer from the second payment source is initiated at block 320. Additionally, if a second payment source is not available, a third and further payment source could be queried for availability. In such an example, whichever source, in a chain of sources, is available for payment is used to satisfy the pending bill. Through such a mechanism a customer can be reasonably assured that their pending bill is paid. In the particular example of a pending bill for the payment of an insurance premium, a non-payment might cause the customer's coverage to lapse.

Figure 4:
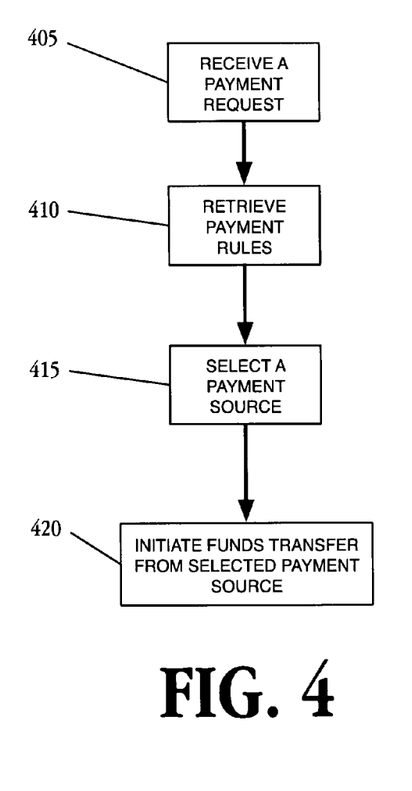
FIG. 4 shows a flow diagram of a method of processing a financial obligation, in accordance with an example embodiment.

FIG. 4 shows a flow diagram of a more detailed method of satisfying a financial obligation, in accordance with an example embodiment. In an embodiment, the operations described in FIG. 4 are carried out on an apparatus, such as that described in FIG. 2B.

At block 405, a payment request is received. This request is related to a financial obligation of a customer, in one embodiment. In an alternate embodiment, the payment request is any transaction where the customer needs funds to be transferred from one of their financial accounts.

At block 410, payment rules are retrieved. The payment rules define how to select a payment source from a list of possible payment sources. In one embodiment, the list of possible payment sources includes primary financial accounts associated with the customer. In an alternate embodiment, the list of possible payment sources includes primary and secondary financial accounts associated with the customer. The payment rules can be pre-configured by the customer at some time before the payment request is received, in one example. In such an example, the customer defines conditions for selecting a payment source from their financial accounts. Such conditions include, but are not limited to the following: minimum amount of funds in the account in order for the account to be available; specific accounts to be used for various transaction types (for example, checking account for credit card bills, credit accounts for utilities); maximum amount of funds that can be transferred out of an account for a single transaction; maximum amount of funds that can be transferred out of an account over a period of time, such as a calendar month; and an account to use as an alternate for each of the financial accounts accessible. These are merely meant as examples and are not meant to be limiting in any manner.

At block 415, a payment source is selected using the rules retrieved at block 410. The payment source selected is then used to initiate a funds transfer at block 420. Through this mechanism, the payment requested in block 405 is satisfied by funds withdrawn from the payment source selected at block 415 through the use of the funds transfer initiated at block 420.

Figure 5:
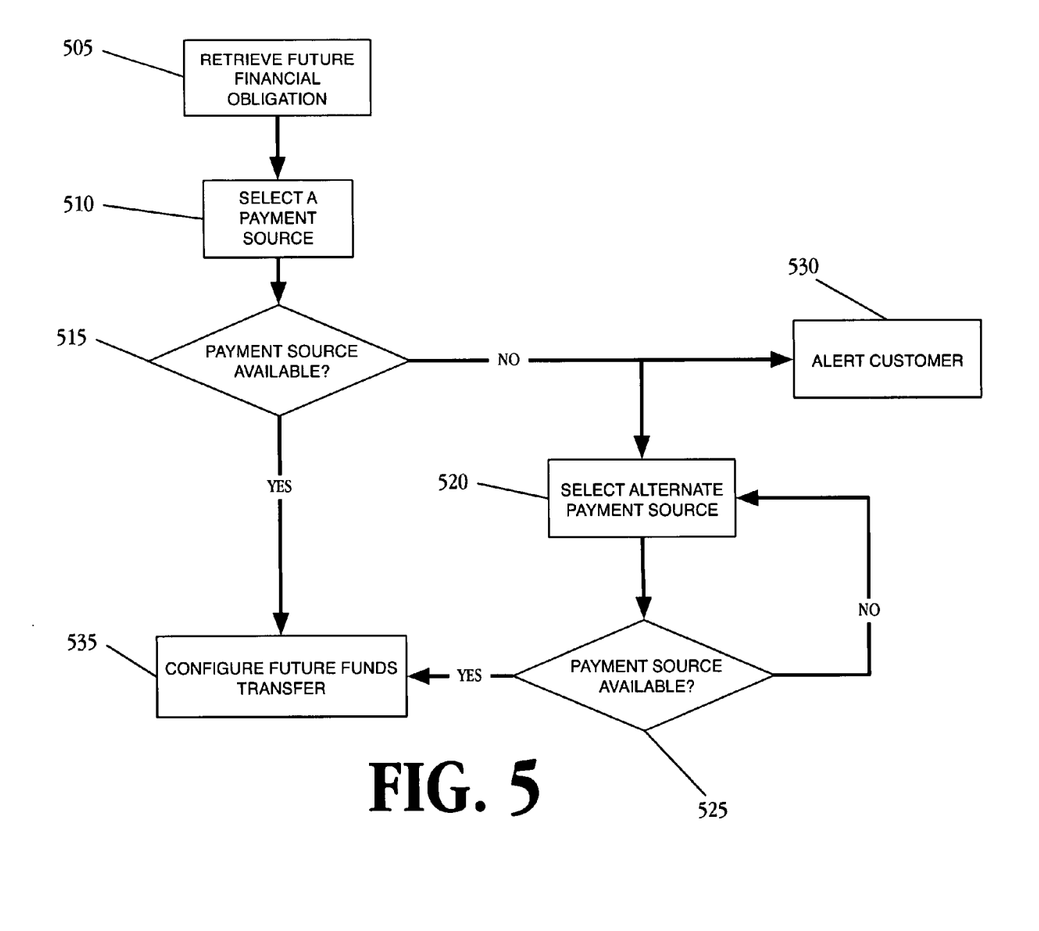
FIG. 5 shows a flow diagram of a method of pre-processing a financial obligation, in accordance with an example embodiment.

FIG. 5 shows a flow diagram of a method of satisfying a financial obligation, in accordance with an example embodiment. In an embodiment, the operations described in FIG. 5 are carried out in an apparatus as described above with respect to FIG. 2B.

At block 505, the system receives a future financial obligation. One example is an automatic deduction from an account that is scheduled to be made, such as a monthly deduction for a monthly insurance premium payment. A mechanism to properly configure a future funds transfer to satisfy the financial obligation can provide the customer greater piece of mind and a warning if there is a problem with it before the transfer is unable to be accomplished. The warning can take any suitable form, such as a phone call from a service representative, an automated email, or the like.

At block 510, the system selects a payment source. In one embodiment, the payment source is selected using methods such as those depicted above with respect to block 415 of FIG. 4. In an alternate embodiment, the system selects the payment source from a list of financial accounts maintained in the primary or secondary financial account database.

The system determines the availability of the payment source at block 515. If the payment source is unavailable, the system selects an alternate payment source. In an embodiment, the system determines the availability of the alternate payment source at block 525. In such an example, this provides that if the alternate payment source is unavailable, a further alternate payment source can be selected. Through these operations, the probability that no payment sources are available for the satisfaction of the financial obligation is reduced. All of the financial accounts associated with the customer can be queried in like manner. The obligation goes unpaid only if all the financial accounts of the customer are unavailable. But if one of the payment sources is unavailable, the customer can be alerted at block 530, in one embodiment.

At block 535, the system configures a future funds transfer to satisfy the future financial obligation using the payment source selected at block 510 or the alternate payment source selected at block 520.

Figure 6:
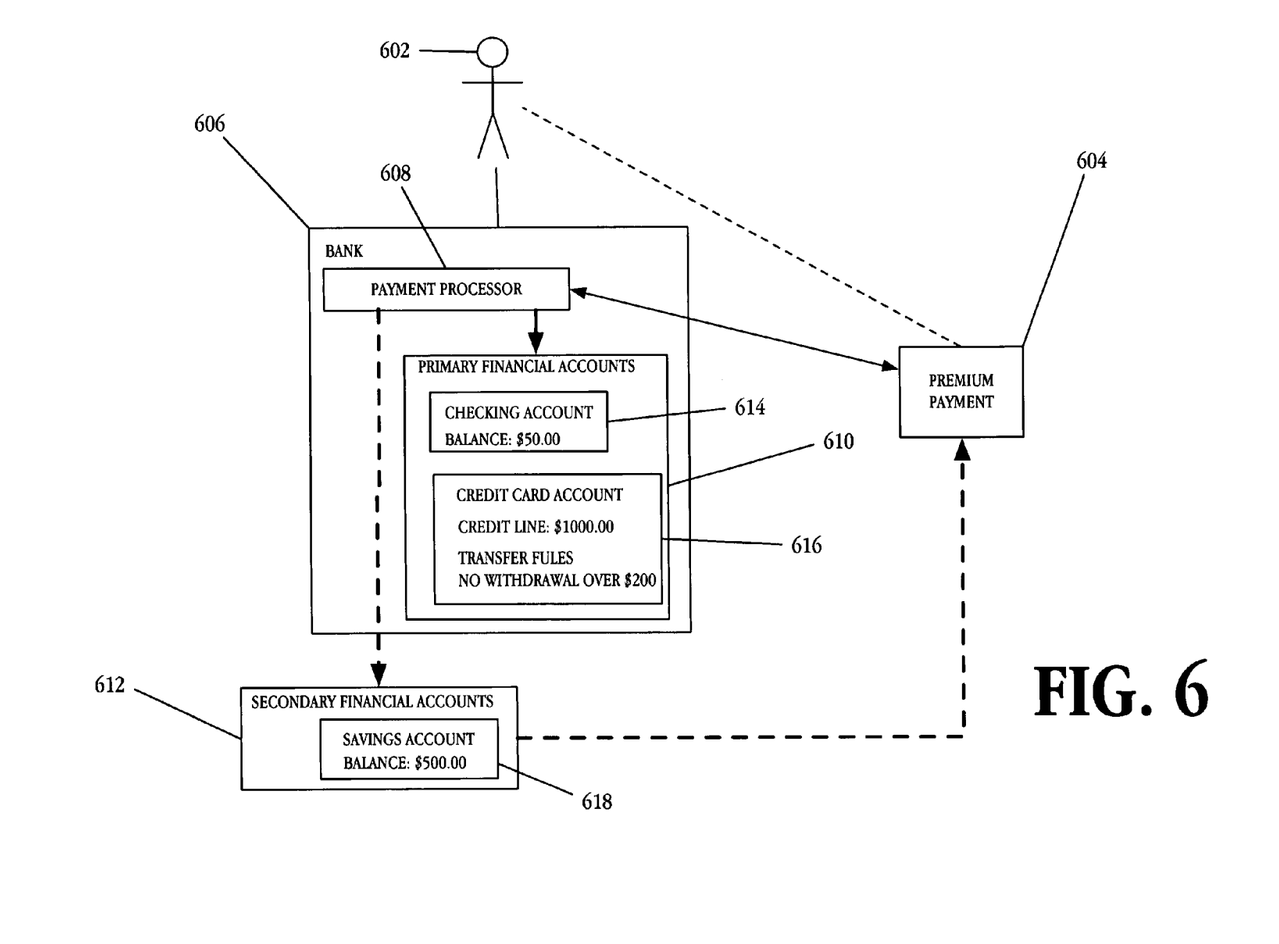
FIG. 6 shows a flow diagram of a method of satisfying a processing obligation in a system, in accordance with an example embodiment.

FIG. 6 shows a flow diagram of a method of satisfying a financial obligation in a system, in accordance with an example embodiment. In order to elaborate on the operations and systems previously presented, reference is made here to an example transaction. In this example, a customer 602 has an insurance policy, which has an associated monthly insurance premium payment 604. The customer pre-configured the payment 604 to be made from the accounts at their bank 606. In this example, the bank deploys a payment processor 608 that is similar, in one example, to the payment processing apparatus 200 described above with respect to FIG. 2B.

The payment processor 608 is configured to process payments for customers of the bank 606, and in particular to process a payment for the customer 602 depicted in FIG. 6. The payment processor 608 is coupled to one or more primary financial accounts 610 and one or more secondary financial accounts 612. The one or more primary financial accounts includes, in this example, a checking account 614 and a credit card account 616. The checking account 614 is administered by the bank 608, and the credit card account 616 is issued by the bank 608. As discussed above, these are considered primary financial accounts, in the context of the present application. The one or more secondary financial accounts include, in this example, a savings account 618. The savings account is not administered by the bank 608 and is considered to be a secondary financial account, in the context of the present application.

For the purposes of this example, the customer 602 has an insurance policy which has a premium payment 604 that is due on the $5^{th}$ day of every month. The customer 602, wishing the convenience of not having to write a check every month, has set-up an automatic deduction of funds from their checking account 614. On the $5^{th}$ of the month, the automatic deduction occurs for $250.00. However, in this example, the checking account 614 has only $50.00. The payment processor 608 selects the checking account 614 as the payment source to pay the premium payment 604 because in this example it was configured that way by the customer 602. But, as the checking account 614 only has $50.00, the account is unavailable for the payment of the premium payment 604. The payment processor 608 selects an alternate payment source, such as the credit card account 616. In this example, the credit card account has a credit limit of $1,000, but also has a rule associated with it that withdrawals over $200 are not allowed. The payment processor then selects a further alternate payment source, such as the savings account 618.

The payment processor 608, using the payment source selected above, the savings account 618, configures a funds transfer from it to satisfy the premium payment 604. In one method, the payment processor 608 could send the instructions to the insurance company that initiated that initial payment request that the savings account be used for this payment. In an alternate method, the payment processor 608 could initiate a funds transfer from the savings account 618 to the bank 606 and then transfer those funds to pay the premium payment. In this latter example, no re-configuration on the part of the insurance company may be needed. In any case, in this situation where a first payment source and a second payment source were unavailable for the payment of the premium payment 604, the customer can still have the premium payment paid. Through this mechanism, their insurance does not lapse.

Though an insurance premium is used as an example, this is not meant to be limiting in any manner. The systems and apparatus described here have equal applicability to any type of financial obligation. Additionally, any type of financial account capable of transferring funds is considered within the scope of the present discussion.

Figure 7:
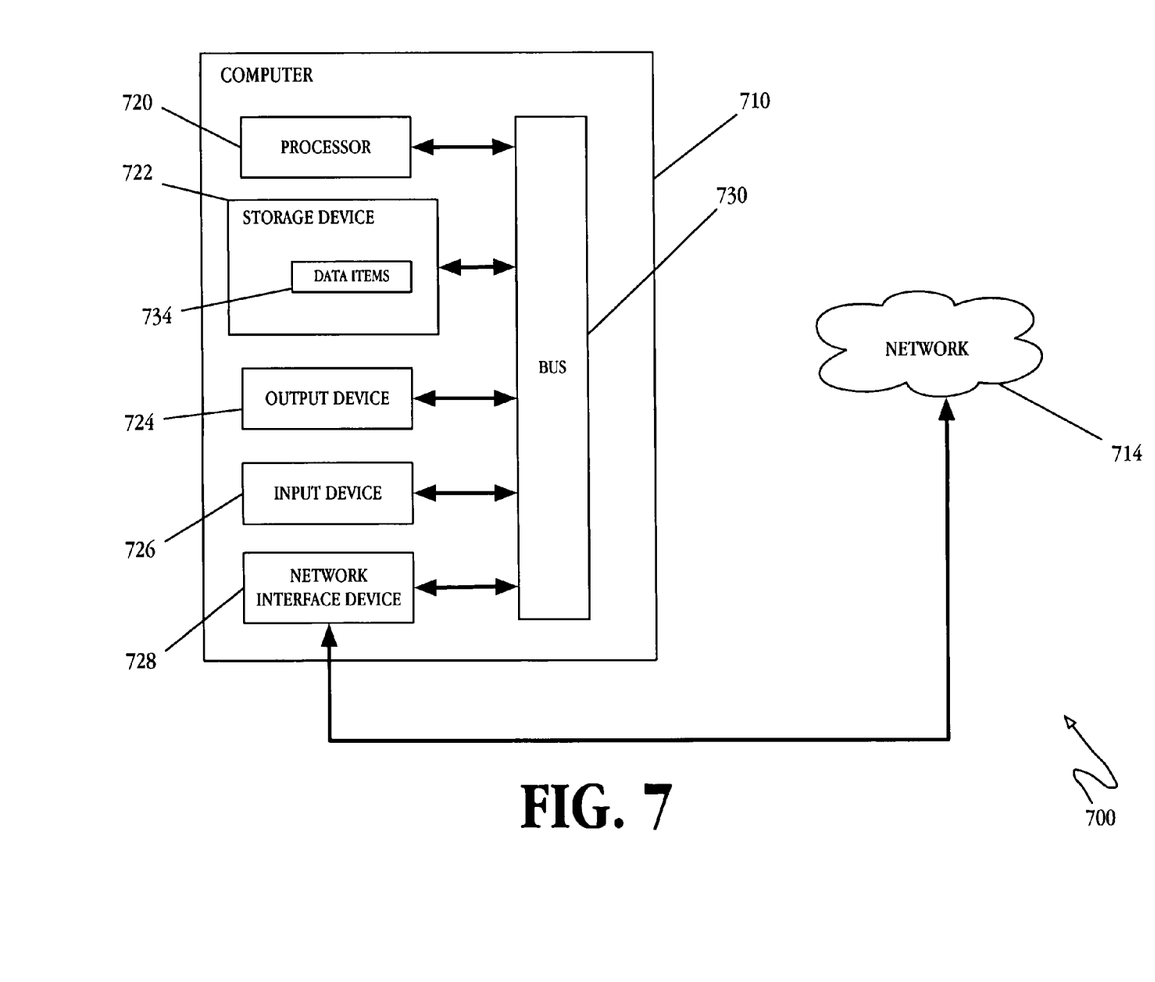
FIG. 7 shows a block diagram of a machine including instructions to perform any one or more of the methodologies described herein.

FIG. 7 shows a block diagram of a machine including instructions to perform any one or more of the methodologies described herein. A system 700 includes a computer 710 connected to a network 714. The computer 710 includes a processor 720, a storage device 722, an output device 724, an input device 726, and a network interface device 728, all connected via a bus 730. The processor 720 represents a central processing unit of any type of architecture, such as a CISC (Complex Instruction Set Computing), RISC (Reduced Instruction Set Computing), VLIW (Very Long Instruction Word), or a hybrid architecture, although any appropriate processor may be used. The processor 720 executes instructions and includes that portion of the computer 710 that controls the operation of the computer. Although not depicted in FIG. 7, the processor 720 typically includes a control unit that organizes data and program storage in memory and transfers data and other information between the various parts of the computer 710. The processor 720 receives input data from the input device 726 and the network 714, reads and stores code and data in the storage device 722, and presents data to the output device 724.

Although the computer 710 is shown to contain only a single processor 720 and a single bus 730, the disclosed embodiments apply equally to computers that may have multiple processors, and to computers that may have multiple busses with some or all performing different functions in different ways.

The storage device 722 represents one or more mechanisms for storing data. For example, the storage device 722 may include read only memory (ROM), random access memory (RAM), magnetic disk storage media, optical storage media, flash memory devices, and/or other machine-readable media. In other embodiments, any appropriate type of storage device may be used. Although only one storage device 722 is shown, multiple storage devices and multiple types of storage devices may be present. Further, although the computer 710 is drawn to contain the storage device 722, it may be distributed across other computers, for example on a server.

The storage device 722 includes a controller (not shown) and data items 734. The controller includes instructions capable of being executed on the processor 720 to carry out the functions, as previously described above. In another embodiment, some or all of the functions are carried out via hardware in lieu of a processor-based system. In one embodiment, the controller is a web browser, but in other embodiments, the controller may be a database system, a file system, or may include any other functions capable of accessing data items. Of course, the storage device 722 may also contain additional software and data (not shown).

Although the controller and the data items 734 are shown to be within the storage device 722 in the computer 710, some or all of them may be distributed across other systems, for example on a server and accessed via the network 714

The output device 724 is that part of the computer 710 that displays output to the user. The output device 724 may be a liquid crystal display (LCD) well-known in the art of computer hardware. But, in other embodiments the output device 724 may be replaced with a gas or plasma-based flat-panel display or a traditional cathode-ray tube (CRT) display. In still other embodiments, any appropriate display device may be used. Although only one output device 724 is shown, in other embodiments any number of output devices of different types, or of the same type, may be present. In an embodiment, the output device 724 displays a user interface.

The input device 726 may be a keyboard, mouse or other pointing device, trackball, touchpad, touch screen, keypad, microphone, voice recognition device, or any other appropriate mechanism for the user to input data to the computer 710 and manipulate a user interface. Although only one input device 726 is shown, in another embodiment any number and type of input devices may be present.

The network interface device 728 provides connectivity from the computer 710 to the network 714 through any suitable communications protocol. The network interface device 728 sends and receives data items from the network 714.

The bus 730 may represent one or more busses, e.g., USB (Universal Serial Bus), PCI, ISA (Industry Standard Architecture), X-Bus, EISA (Extended Industry Standard Architecture), or any other appropriate bus and/or bridge (also called a bus controller).

The computer 710 may be implemented using any suitable hardware and/or software, such as a personal computer or other electronic computing device. Portable computers, laptop or notebook computers, PDAs (Personal Digital Assistants), pocket computers, appliances, telephones, and mainframe computers are examples of other possible configurations of the computer 710. For example, other peripheral devices such as audio adapters or chip programming devices, such as EPROM (Erasable Programmable Read-Only Memory) programming devices may be used in addition to, or in place of, the hardware already depicted.

The network 714 may be any suitable network and may support any appropriate protocol suitable for communication to the computer 710. In an embodiment, the network 714 may support wireless communications. In another embodiment, the network 714 may support hard-wired communications, such as a telephone line or cable. In another embodiment, the network 714 may support the Ethernet IEEE (Institute of Electrical and Electronics Engineers) 802.3x specification. In another embodiment, the network 714 may be the Internet and may support IP (Internet Protocol). In another embodiment, the network 714 may be a local area network (LAN) or a wide area network (WAN). In another embodiment, the network 714 may be a hotspot service provider network. In another embodiment, the network 714 may be an intranet. In another embodiment, the network 714 may be a GPRS (General Packet Radio Service) network. In another embodiment, the network 714 may be any appropriate cellular data network or cell-based radio network technology. In another embodiment, the network 714 may be an IEEE 802.11 wireless network. In still another embodiment, the network 714 may be any suitable network or combination of networks. Although one network 714 is shown, in other embodiments any number of networks (of the same or different types) may be present.

The embodiments described herein may be implemented in an operating environment comprising software installed on any programmable device, in hardware, or in a combination of software and hardware.

Although embodiments have been described with reference to specific example embodiments, it will be evident that various modifications and changes may be made to these embodiments without departing from the broader spirit and scope of the invention. Accordingly, the specification and drawings are to be regarded in an illustrative rather than a restrictive sense.

What is claimed is:

1. A machine-readable medium having machine-executable instructions to process a financial obligation of a customer, the machine-executable instructions causing the processor to perform the method comprising:

maintaining a database of one or more financial accounts available to the customer;

executing an attempted funds transfer from a first payment source selected by the customer to satisfy the financial obligation of the customer, the financial obligation being scheduled in-advance of the financial obligation becoming due;

receiving a non-payment indication resulting from the attempted funds transfer from the first payment source, the non-payment indication indicating that the attempted funds transfer cannot be completed from the first payment source;

in response to receiving the non-payment indication resulting from the attempted funds transfer from the first payment source, alerting the customer the attempted funds transfer could not be completed from the first payment source;

determining a second payment source with sufficient funds to satisfy the financial obligation of the customer based on a condition defined by the customer;

initiating a funds transfer from the second payment source to satisfy the financial obligation of the customer, the financial obligation being scheduled in-advance of the financial obligation becoming due; and notifying one or more companies to which the customer has other financial obligations that the secondary payment source should be used for payment of the other financial obligations.

2. The machine-readable medium of claim 1, wherein an entity is associated with initiating the funds transfer and the machine-executable instructions causing the processor to perform the method further comprising:

receiving an authorization from the customer authorizing all accounts associated with the entity may be used to satisfy the financial obligation;

storing, on the database, as primary financial accounts all the accounts associated with the entity;

receiving from the customer one or more secondary financial accounts that are not maintained by the entity; and storing, on the database, the one or more secondary financial accounts.

3. The machine-readable medium of claim 2, wherein the primary financial accounts are dynamically maintained.

4. The machine-readable medium of claim 2, wherein the database comprises a primary account database having stored thereon the primary financial accounts and a secondary database having stored thereon the one or more secondary financial accounts.

5. The machine-readable medium of claim 4, wherein the secondary account database is not able to be dynamically queried to determine a present financial state of one of the one or more secondary accounts and the primary account database can be dynamically queried to determine the present financial state of one of the primary accounts.

6. The machine-readable medium of claim 1, wherein the condition defined by the customer includes one or more of the following: a minimum amount of funds in the second payment source, specific financial accounts to be used as the second payment source for various transaction types, a maximum amount of funds that can be transferred in a single transaction, and a maximum amount of funds that can be transferred over a period of time.

7. A system for processing a financial obligation of a customer, the system comprising:

a processor;

a primary database having stored thereon one or more financial accounts available to the customer, wherein the one or more financial accounts can be dynamically queried for a financial state;

a transfer module executing on the processor to execute a funds transfer from a first payment source selected by the customer to satisfy the financial obligation of the customer, the financial obligation being scheduled in-advance of the financial obligation becoming due; and a payment processor module executing on the processor, configured to:

determine if the first payment source is unavailable;

in response to determining if the first payment source is unavailable, alerting the customer a funds transfer can not be completed from the first payment source;

determine a second payment source with sufficient funds to satisfy the financial obligation of the customer by dynamically querying the primary database, and the second payment source is also selected based on a condition defined by the customer; and initiate the funds transfer from the second payment source to satisfy the financial obligation of the customer, the financial obligation being scheduled in-advance of the financial obligation becoming due, wherein the system notifies one or more companies to which the customer has other financial obligations that the secondary payment source should be used for payment of the other financial obligations.

8. The system of claim 7, wherein the one or more financial accounts are administered by an operator of the payment processor module, the system further comprising:

a network interface device to receive an authorization from the customer authorizing all accounts associated with the operator may be used to satisfy the financial obligation;

the network interface device to also receive from the customer one or more secondary financial accounts that are not maintained by the operator, wherein the one or more secondary financial accounts are not capable of being dynamically queried; and a secondary database to store the one or more secondary financial accounts.

9. The system of claim 7, further comprising a secondary account database having stored thereon financial accounts that are administered by an operator other than the operator of the payment processor module.

10. The system of claim 9, wherein the secondary account database references financial accounts that are administered by an operator other than the operator of the payment processor module and the financial accounts include a savings account.

11. The system of claim 7, wherein the primary account database references financial accounts that are administered by an operator of the payment processor module and the financial accounts include a checking account, a credit card account, and a credit line.

12. The system of claim 7, wherein the condition defined by the customer includes one or more of the following: a minimum amount of funds in the second payment source, specific financial accounts to be used as the second payment source for various transaction types, a maximum amount of funds that can be transferred in a single transaction, and a maximum amount of funds that can be transferred over a period of time.

13. A method of processing a financial obligation of a customer, the method comprising:

maintaining a database of one or more financial accounts available to the customer, wherein the one or more financial accounts include primary accounts that can be dynamically queried to determine financial states of the primary accounts;

selecting a first payment source to satisfy the financial obligation of the customer from one or more financial accounts associated with the customer and stored the database, the financial obligation being scheduled in-advance of the financial obligation becoming due;

determining the first payment source is not available;

in response to determining the first payment source is not available, alerting the customer the attempted funds transfer could not be completed from the first payment source;

determining, at the payment processor, a second payment source with sufficient funds to satisfy the financial obligation of the customer based on a condition defined by the customer;

initiating a funds transfer from the second payment source to satisfy the financial obligation of the customer; and notifying one or more companies to which the customer has other financial obligations that the second payment source should be used for payment of the other financial obligations.

14. The method of claim 13, wherein determining a second payment source with sufficient funds includes dynamically querying all of the primary accounts in the database.

15. The method of claim 13, wherein the one or more accounts include a secondary account that cannot be dynamically queried.

16. The method of claim 13, wherein the primary accounts on the database are dynamically maintained.

17. The method of claim 13, wherein the second payment source is a primary account.

18. The method of claim 13, further comprising:

receiving an authorization from the customer authorizing all accounts associated with an operator of the payment process to be used to satisfy the financial obligation;

receiving from the customer one or more secondary financial accounts that are not maintained by the operator, wherein the one or more secondary financial accounts are not capable of being dynamically queried; and storing in the database the one or more secondary financial accounts.

19. The method of claim 13, wherein selecting an alternate payment source comprises:

if further alternate payment sources are available, determining their availability until a further alternate payment source is available and no further alternate payment source exists.

* * * * *